3,396,510
LIQUID MEMBRANES FOR USE IN THE SEPARATION OF GASES

William J. Ward III, and Walter L. Robb, Scotia, N.Y., assignors to General Electric Company, a corporation of New York
No Drawing. Filed Aug. 15, 1966, Ser. No. 572,222
14 Claims. (Cl. 55—16)

ABSTRACT OF THE DISCLOSURE

The application of the phenomenon of facilitated transport to liquid membranes to more than double the separation factor for gases of such a modified liquid membrane is described. Facilitated transport is made possible by introducing into the immobilized liquid film a large concentration of at least one selected, non-volatile specie, which is soluble in the immobilized liquid and is reversibly reactive with the specific gaseous component to be separated from a mixture of gases, the reaction being productive of a soluble non-volatile specie in large concentration. Examples are given of non-volatile species useful for the facilitated transport separation of $CO_2$, $SO_2$ and $O_2$ gases.

---

This invention relates to the separation of gases by differential permeation through liquid, or quasi-liquid films behaving substantially as polymeric films, and more particularly to the application of facilitated transport of gases across such a quasi-liquid membrane whereby the separation factor of $CO_2$ from $O_2$, for example, can be increased from about 30 to 300 times the separation factor obtained with the liquid films known and described heretofore.

The term "quasi-liquid film" refers to a film of immobilized liquid such as may be prepared by swelling a polymer film with the liquid proposed for effecting the separation, with the swelling being effected to the extent that the liquid itself becomes the controlling resistance to permeation. In each case in order to be of any practical use, the liquid and its support or immobilizing structure must be so correlated to enable the application of a significant pressure differential (at least about one atmosphere) across the liquid film without resulting in forcing the liquid out of the membrane.

The use of liquid (interpreted herein as including quasi-liquid) membranes for gas separation has been disclosed in U.S. application Ser. No. 468,727, Robb et al., filed July 1, 1965 (now U.S. Patent 3,335,545) and assigned to the assignee of this application and the aforementioned application is incorporated herein by reference. It was disclosed in this application that the conventionally recognized solid polymer barrier well-known in the art for the separation of gases through the phenomenon of selective permeation can be replaced by a liquid film resulting in a considerable increase in the degree of separation of certain gases.

Immobilization or support of such a liquid film can be effected a number of ways. Thus, the thin liquid membrane can be supported on a porous, unwet backing having such fine holes that the liquid cannot run through the porous material; the liquid film can be supported on a noninteracting polymer film selected so that the ratio of permeation rate to thickness will be appreciably higher for the polymer than for the liquid film thereby insuring that the liquid film is the controlling permeation factor, or various polymer films can be made to take up large quantities of liquid as described in the Robb et al. application.

Although this invention is broadly directed to the improvement and use of a liquid film as a means for gas separation and is not intended to be limited to the separation of particular gaseous components by the use of particular liquid films, there are certain gas separations such as the separation of $CO_2$ and $O_2$, which are of particular interest, as for example for maintaining the life-supporting environment in a space vehicle with a minimum penalty for weight and power.

By way of illustration silicone rubber, which appears to provide the best overall performance of the known polymeric films, is able to supply a separation factor for $CO_2/O_2$ of about 5.5 and a $CO_2$ permeability of about $$300 \times 10^{-9} \frac{\text{cc. of gas, cm.}}{\text{sec., cm.}^2, \text{cm. Hg}}$$

The separation factor for $CO_2/O_2$ is defined as the ratio of the permeability of $CO_2$ to the permeability of $O_2$. Such performance would require 11 stages of sequential treatment to concentrate $CO_2$ gas in a spacecraft from about 1 percent to about 95 percent, at which concentration the $CO_2$ would be exhausted. The power and weight requirements for such a system would be prohibitive. An immobilized sheet of water provides a separation facor for $CO_2/O_2$ of about 25 and a $CO_2$ permeability of about $$244 \times 10^{-9} \frac{\text{cc. of gas, cm.}}{\text{sec., cm.}^2, \text{cm. Hg}}$$

With this construction the number of stages can be reduced to three employing a layer of water one mil thick. By means of this invention, however, the separation and concentration of $CO_2$ can be effected in a single stage.

The improvement of this invention whereby the transport of gases across a liquid film has been increased by a totally unexpected factor can best be understood by considering a phenomenon known as "facilitated transport," which phenomenon is believed to occur in biological systems and has been simulated in biophysical investigations. Thus, assuming a chemical reacton wherein A reacts with B according to the reaction $A + B \rightleftharpoons AB$, if it is assumed A is a gas and B and AB are non-volatile molecular, or ionic, species present in a liquid film, when a difference in the concentration of A is maintained across the film (by maintaining a difference in partial pressure of A at the opposite faces of the film), there is established a difference in the concentration of AB, which is in the same direction (increasing or decreasing) as the A concentration difference. Also a concentration difference in B is established, which increases or decreases in the opposite direction from the A concentration difference. Stated in another way, in proceeding from a first face of a liquid film to the opposite face thereof, if the concentration of A is decreasing with distance across the film, the concentration of B is increasing and the concentration of AB is decreasing. As the result of these differences in concentrations, there is a transport of species A and AB in the same direction across the film, and a transport of B, which is equal in magnitude, but opposite in direction to the transport of AB. The total amount of A which passes across the film is the sum of the rates of flow of A and AB across the film. By this analysis it may be seen that a shuttle mechanism for A is established in the film in this manner whereby by diffusion of AB and by the continuous unloading of A from AB at the side of the film, where the low partial pressure of A exists, the transport of A is facilitated.

If the rate of reaction of A with B is slow relative to the rate of diffusion of A across the liquid film, it has been found that the extent of facilitation of the transport can be improved by catalyzing the reaction.

It is, therefore, the prime object of this invention to extend the use of liquid permselective membranes to more practical utilization in the separation of gases by introducing into an immobilized liquid film a large concentration of selected, non-volatile specie reactive with the gaseous component to be removed and productive of a non-volatile specie, also in large concentration.

It is a further object of this invention to define specific chemical reactions by which certain gases can be separated by means of liquid films much more effectively by the use of facilitated transport and even this performance can be increased by at least a factor of 2.5 by the selection and use of specific catalyst materials therewith.

It is a particular object of this invention to provide a grossly increased $CO_2/O_2$ separation factor to provide a system for the reliable and effective removal of $CO_2$ from the atmosphere of a spacecraft, or submarine.

This invention may be illustrated by the separation of $CO_2$ and $O_2$. Thus, it has been found that by the addition of an amount of an alkali bicarbonate as for example, $NaHCO_3$, $KHCO_3$ $CsHCO_3$, etc., sufficient to provide a concentration of $HCO_3^-$ of at least one mole per liter (1 N) in a liquid film, the liquid film can be rendered capable of significant facilitated transport of $CO_2$ according to the equation: $2HCO_3^- \rightleftharpoons H_2O + CO_3^= + CO_2$. This equation provides a shorthand representation of the series of reactions actually occurring in the system.

Assuming some significant difference in partial pressure of $CO_2$ across the liquid film, this reaction tends to proceed more rapidly to the left at the high partial pressure face of the liquid film and $CO_2$ enters the film more rapidly than it would enter in absence of this reaction. At the low partial pressure face of the film, the reverse action occurs and $CO_2$ leaves the film more rapidly than in the absence of this reaction. In the bulk of the film between the faces of the film $CO_2$ is transported in the form of $HCO_3^-$. The useful partial pressure difference in the practice of this invention is in order of one atmosphere with the low partial pressure side being at a pressure approaching zero, for example, in the case of the $CO_2$—$HCO_3^-$—$CO_3^=$ system, the low partial pressure is preferably below about 0.01 atmosphere. For other systems, the optimum partial pressure difference can be determined from the value of the equilibrium constant for the particular reaction providing the mechanism of facilitated transport, if such value is available in the literature. If the equilibrium constant is not known, it can be determined by routine experimentation. Other additives to provide the requisite $HCO_3^-$ concentration would be hydroxides of the alkali metals, which become converted to the bicarbonate form.

The addition of the carrier specie serves not only to facilitate transport of the reactive component of the gas mixture, but also serves a second function, that is, to decrease the solubilities of the non-reacting gases. This decrease in solubilities has the effect of actually lowering the permeabilities of these non-reacting gases and thereby increasing still further the separation factors.

In addition to the immobilized liquid films described in the Robb et al. application, modified cellulosic ester films having a structure substantially in accordance with that produced by the practice of the invention described in U.S. 3,133,132, Loeb et al. and U.S. 3,133,137, Loeb et al. have been successfully employed in the practice of the instant invention. Such immobilized films may be impregnated after fabrication by soaking in a solution of the alkali bicarbonate of the appropriate concentration. A soaking time of 12 hours is adequate although this length of time is not critical.

The $CO_2/O_2$ separation factors in modified cellulose acetate films containing various solutions of alkali bicarbonates has been measured and the results are listed in Table I. The partial pressures of $CO_2$ were 0.045 atmosphere on the high pressure side and 0.0026 atmosphere on the low pressure side.

TABLE I:—$CO_2/O_2$ SEPARATION FACTOR IN CELLULOSE ACETATE FILMS CONTAINING VARIOUS SOLUTIONS OF ALKALI BICARBONATES

| Impregnating solution | $CO_2/O_2$ separation factor | Approximate $CO_2$ permeability, cc. gas (NTP), cm. $\overline{\text{sec., cm.}^2\text{, cm. Hg}} \times 10^9$ |
|---|---|---|
| Pure water | 22 | 40 |
| 2.0 N $KHCO_3$ | 43 | 50 |
| 1.6 N $CsHCO_3$ | 67 | |
| 2.8 N $CsHCO_3$ | 240 | |
| 6.4 N $CsHCO_3$ (saturated solution) | 800 | 100 |

The above data are known to be conservative, because of the limitations of the measuring apparatus and, in fact, this has been established by measuring with a refined apparatus, whereby the $CO_2/O_2$ separation factor for 6.4 N $CsHCO_3$ was found to be 1400.

In addition to facilitating the transport of $CO_2$ across the film and depressing the transport of $O_2$ across the film, the presence of concentrated alkali bicarbonate also has the added advantage of reducing the water vapor pressure of the immobilized liquid in the film. It has been found that a saturated $CsHCO_3$ solution has a water vapor pressure approximately 70 percent of that of pure water and this behavior eases the problem of keeping water in the membrane and minimizes possible loss of the water to the gas phase on the low pressure side of the film.

It has been found that the high separation factor resulting from the introduction into a liquid film of a carrier specie providing facilitated transport in the liquid film can be increased even more in the case of a slow reaction between the reactant gas and the carrier specie by the introduction into the film of a catalyst functioning to increase the speed of the reaction(s) occurring in the liquid film. In the case of $CO_2/O_2$ separation, it has been found that sodium arsenite or carbonic anhydrase, an enzyme present in most living organisms, function in this catalytic capacity. In general, any material that increases the rate of any reaction in the film whereby the $CO_2$ is reversibly converted into $HCO_3^-$ is an acceptable catalyst.

This improvement can best be understood by considering the chemical reactions which occur when $CO_2$ passes through a liquid film containing a high concentration of bicarbonate ions. These reactions are:

$$CO_2 + OH^- \rightleftharpoons HCO_3^- \quad (1)$$
$$CO_2 + H_2O \rightleftharpoons HCO_3^- + H^+ \quad (2)$$
$$HCO_3^- \rightleftharpoons H^+ + CO_3^= \quad (3)$$

The extent to which $CO_2$ transport is facilitated is dependent upon the speed of reactions 1 and 2 (reaction 3 can be considered to be infinitely fast). If reaction 1 or 2 could be catalyzed, the facilitated transport of $CO_2$ could be increased, causing a corresponding increase in the $CO_2/O_2$ separation factor. A number of materials have been found to catalyze reaction 2. The results of the use of some of these catalysts are summarized in Table II, those results having an asterisk adjacent thereto have been obtained with the refined apparatus:

It has, thus, been unexpectedly determined that the addition to a liquid film of a non-volatile carrier specie reversibly reactive with a specific gaseous component of a gas mixture to produce a non-volatile material pro- TABLE II.—EFFECT OF CATALYSTS ON $CO_2/O_2$ SEPARATION FACTOR AND $CO_2$ PERMEABILITY

| Alkali bicarbonate | Catalyst | $CO_2/O_2$ Separation Factor | | Approximate $CO_2$ permeability cc. gas (NTP), cm. thick —————————×10⁹ sec., cm.², cm. Hg | |
|---|---|---|---|---|---|
| | | Without catalyst | With catalyst | Without catalyst | With catalyst |
| 2 N $KHCO_3$ | 0.5 N $Na_2SeO_3$ | 78 | 170–300 | 50 | 400 |
| 2 N $KHCO_3$ | 2 g./liter carbonic anhydrase | 78 | 200–500 | 50 | 150–400 |
| 2 N $KHCO_3$ | 0.5 N $NaAsO_2$ | 78 | 600–800 | 50 | 200 |
| 6.4 N $CsHCO_3$ | 0.5 N $K_2SO_3$ | 800 | 1,200 | 100 | 150 |
| 6.4 N $CsHCO_3$ | 0.5 N $NaAsO_2$ | *1,400 | *4,100 | *75 | *214 |
| 6.4 N $CsHCO_3$ | 0.5 N $NaAsO_2$, 2 g./liter carbonic anhydrase. | 800 | 3,800 | 100 | 340 |

Arsenite salts appear to be the most practical catalysts, since they are chemically stable, highly active and inexpensive. The optimum concentration of arsenite catalyst for a given cesium bicarbonate solution would be obtained by saturating the solution with respect to arsenite salt. For example, the combination of 6.4 N $CsHCO_3$ and .5 N $NaAsO_2$ represents the limit in solubility of the $HCO_3^-$ and $AsO_2^-$ salts in preparing the impregnating solution.

Most of the examples shown in Table II indicate the effect of additions of single catalysts, however, combinations of catalyst materials may be employed as well.

Therefore, by the practice of this invention the commercial applicability of liquid films to gas separation has been considerably enhanced and this same mechanism is applicable not only to the separation of $CO_2$ from $H_2$, $N_2$, He or any gas, which does not react with the liquid film solution, but also to the separation of $SO_2$ or $O_2$ from other gases in the same manner.

In the case of $SO_2$, the mechanism of facilitated transport is defined by the equation:

$$2HSO_3^- \rightleftharpoons H_2O + SO_3^= + SO_2$$

With a partial pressure difference in $SO_2$ across the film, the addition of an alkali sulfite, for example, sodium sulfite, potassium sulfite, etc., a large concentration difference of $HSO_3^-$ ions and $SO_3^=$ ions are established across the film. In the same general manner as has been described for $CO_2$, $SO_2$ enters the liquid film at the high partial pressure face, followed by a continuous diffusion of $HSO_3^-$ ions from the high partial pressure side to the low partial pressure (less than about 0.0001 atmosphere) side, and subsequent unloading of $SO_2$ from $HSO_3^-$ at the low partial pressure face. A high degree of separation of $SO_2$ from non-reacting gases such as $O_2$, $H_2$, He, CO can thus be accomplished.

Facilitated transport of $O_2$ can be defined by the equation describing the reversible reaction thereof with a chelate (Ch), as for example, the sodium salt of iron (II) phthalocyanine tetrasulfonic acid or a material from the group defined as water soluble sulfonated cobalt (II) bis-salicylaldehyde amines, $Ch + O_2 \rightleftharpoons ChO_2$. With a partial pressure difference of about one atmosphere, the general mechanism described hereinabove as

$$A + B \rightleftharpoons AB$$

is established by the addition of the chelate (or other species, which forms a complex compound with oxygen) to the immobilized liquid film and the oxy(chelate) shuttle provides facilitated transport of the $O_2$. Non-reacting gases, such as $N_2$, do not receive the benefit of the considerable increase in transfer and separation is thereby increased such as to make much more attractive the commercial separation of $O_2/N_2$ to provide either enriched $O_2$ or enriched $N_2$. The preparation of the Na salt of iron (II) phthalocyanine tetrasulfonic acid is described in U.S. 2,613,128, Baumann and the water-soluble sulfonated amines are well-known in the dye industry.

vides a completely disproportionate improvement in the separation factor of the specific gaseous component from separation factors known heretofore.

What we claim as new and desire to secure by Letters Patent of the United States is:

1. In an apparatus for the preferential removal of a given gaseous component from a mixture of gases, the apparatus comprising a chamber, a portion of the wall area of the chamber being a permeable membrane, means in communication with the chamber for conducting the mixture of gases thereto into contact with the inner side of the permeable membrane and means for removing from the outer side of the permeable membrane a gas mixture rich in said given gaseous component, the improvement comprising:
  (a) an immobilized liquid film as the permeable membrane,
    (1) said liquid film containing dissolved therein at least one non-volatile carrier specie reversibly chemically reactive with said given gaseous component, the material resulting from the chemical combination of said given component and said carrier specie being soluble and non-volatile.

2. The improvement substantially as recited in claim 1 wherein the immobilized liquid film is a modified cellulosic ester membrane.

3. The improvement substantially as recited in claim 2 wherein the cellulosic ester is cellulose acetate.

4. The improvement substantially as recited in claim 1 wherein the concentration of non-volatile carrier specie is at least about one mole per liter of the liquid in the film.

5. The improvemment substantially as recited in claim 1 specifically for the separation of $CO_2$ from a gas mixture wherein the film is an aqueous film and the carrier specie is an alkali bicarbonate present in the film in a concentration of at least about one mole per liter of water in said film.

6. The improvement substantially as recited in claim 5 wherein a catalyst is contained in the aqueous film in addition to the alkali bicarbonate.

7. The improvement substantially as recited in claim 5 wherein a soluble arsenite salt is present in the aqueous film.

8. The improvement substantially as recited in claim 1 wherein the film is an aqueous film and the carrier specie is an alkali sulfite whereby $SO_2$ can be separated from a gas mixture by facilitated transport.

9. The improvement substantially as recited in claim 1 wherein the film is an aqueous film and the carrier specie is a chelate, whereby $O_2$ can be separated from a gas mixture by facilitated transport.

10. In a method for the separation of a given gas from a mixture of gases by the bringing of the mixture into contact with one side of an immobilized liquid permselective film under a partial pressure differential in said given gas across said film, the improvement comprising:
  (a) impregnating said liquid film with a soluble non-volatile carrier specie reversibly chemically reactive with said given gas and productive of a non-volatile material soluble in said liquid film.

11. The method substantially as recited in claim 10 wherein carbon dioxide is to be separated from a mixture of gases and the carrier specie is an alkali bicarbonate.

12. The improved method substantially as recited in claim 10 wherein the concentration of non-volatile carrier specie is at least about 1 mole per liter of the liquid in the film.

13. The improved method substantially as recited in claim 10 wherein a catalyst is contained in the liquid film in addition to the non-volatile carrier specie.

14. The improved method substantially as recited in claim 13 wherein the liquid film is an aqueous film, the carrier specie is an alkali bicarbonate present in the film in a concentration of at least about 1 mole per liter of water in said film and the catalyst is a soluble arsenite salt.

References Cited

UNITED STATES PATENTS

| | | |
|---|---|---|
| 3,133,132 | 5/1964 | Loeb et al. |
| 3,133,137 | 5/1964 | Loeb et al. |
| 3,212,498 | 10/1965 | McKirdy et al. ____ 210—321 X |
| 3,244,763 | 4/1966 | Cahn. |

REUBEN FRIEDMAN, *Primary Examiner.*

J. ADEE, *Assistant Examiner.*